United States Patent [19]
Merlo et al.

[11] Patent Number: 5,416,389
[45] Date of Patent: May 16, 1995

[54] HORIZONTAL DEFLECTION STAGE LINEARITY CONTROL DEVICE

[75] Inventors: Mauro Merlo, Torre d'Isola; Silvano Gornati, Casorezzo, both of Italy

[73] Assignee: SGS-Thomson Microelectronics s.r.l., Agrate Brianza, Italy

[21] Appl. No.: 916,386

[22] Filed: Jul. 20, 1992

[30] Foreign Application Priority Data

Jul. 23, 1991 [IT] Italy .................. T091A0579

[51] Int. Cl.⁶ .................. G09G 1/04; H01J 29/70
[52] U.S. Cl. ..................... 315/370; 315/389
[58] Field of Search ............. 315/370, 371, 387, 389

[56] References Cited

U.S. PATENT DOCUMENTS

| | | | |
|---|---|---|---|
| 3,796,911 | 3/1974 | Ensor et al. | 315/387 |
| 3,996,611 | 12/1976 | Toone | 355/51 |
| 4,188,567 | 2/1980 | Monroe | 315/356 |
| 4,297,620 | 10/1981 | Quan | 315/389 |
| 4,302,708 | 11/1981 | Spilsbury | 315/389 |
| 4,423,358 | 12/1983 | den Hollander | 315/371 |
| 4,868,464 | 9/1989 | Watanabe et al. | 315/371 |
| 5,970,894 | 7/1976 | Yasuda et al. | 315/370 |

FOREIGN PATENT DOCUMENTS 2072447 9/1981 United Kingdom .

*Primary Examiner*—Gregory C. Issing
*Attorney, Agent, or Firm*—Seed and Berry

[57] ABSTRACT

A device for controlling the linearity of a horizontal deflection stage comprising a deflection yoke supplied with a yoke current controlled by a switch and series-connected to a capacitor for varying the yoke voltage according to the phase of the yoke current; the device comprising a circuit for detecting and generating a real signal proportional to the yoke current, a ramp generator for generating an ideal ramp signal having rising portions defining a given S-shaped waveform, and an error amplifier for receiving the real and ideal ramp signals and generating an error signal for driving a power transistor having its emitter and collector terminals connected parallel to the capacitor for modifying the voltage in the capacitor so that the yoke current assumes the required waveform.

11 Claims, 3 Drawing Sheets

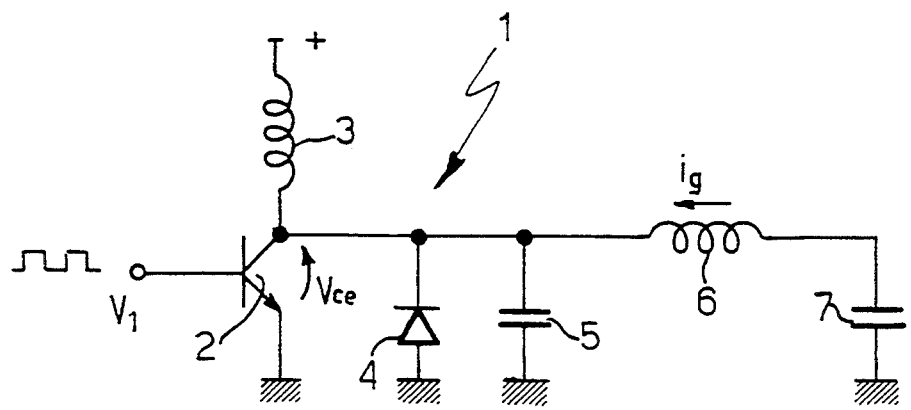
Fig. 1
(Prior Art)
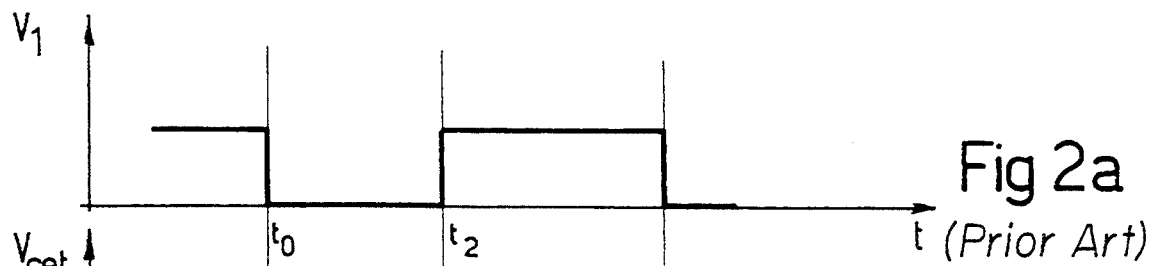
Fig 2a
(Prior Art)
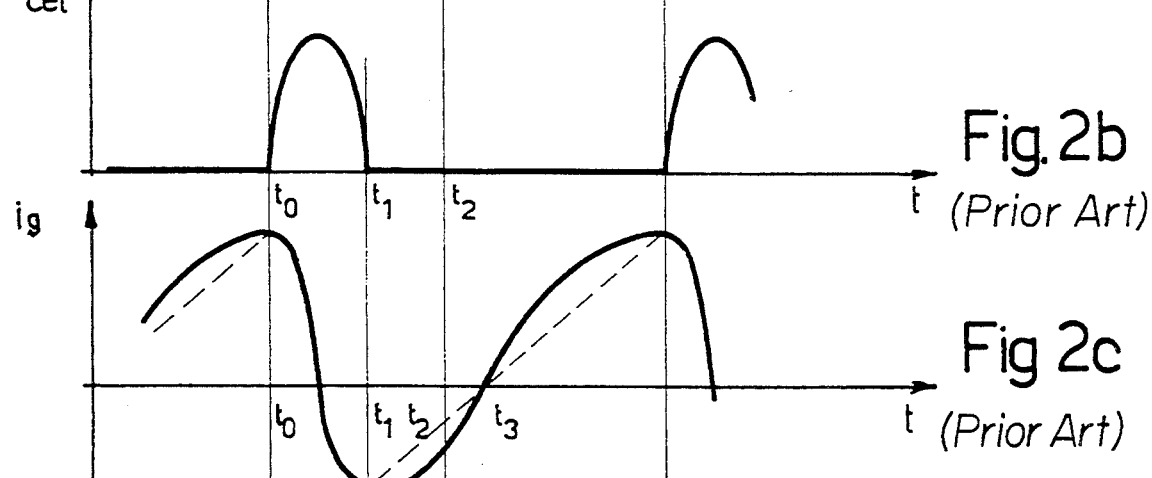
Fig. 2b
(Prior Art)
Fig 2c
(Prior Art)
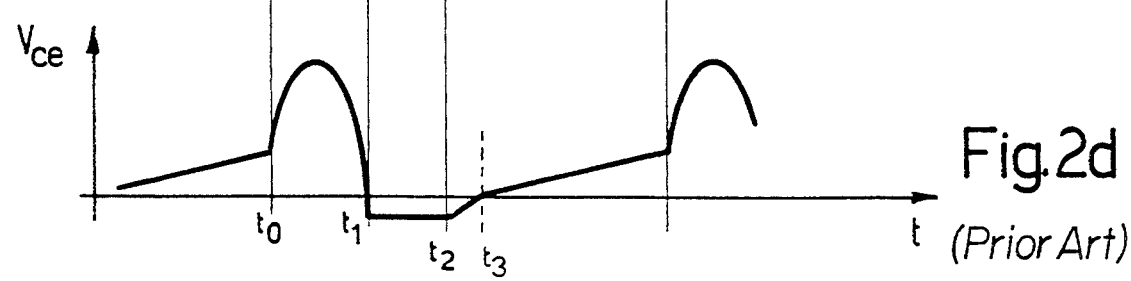
Fig. 2d
(Prior Art)

HORIZONTAL DEFLECTION STAGE LINEARITY CONTROL DEVICE

TECHNICAL FIELD

The present invention relates to a device for controlling the linearity of horizontal deflection stages of monitors and television screens.

BACKGROUND OF THE INVENTION

The horizontal deflection stages of monitors and television screens provide for generating a substantially sawtooth current in a deflection yoke, which in turn produces the magnetic field required for sweeping the electron beam of the cathode-ray tube.

For this purpose, unlike vertical deflection stages, currently used horizontal deflection stages employ switch circuits, due to the values of the physical quantities involved. FIG. 1 indicates a typical known deflection stage comprising an NPN transistor 2 defining the switching element, and having the emitter grounded, the collector connected to one terminal of primary winding 3 of a line transformer (shown only partially), and the base defining the control terminal to which is supplied a rectangular control signal $V_1$. The other terminal of winding 3 is connected to the positive supply, while the collector of transistor 2 is connected to the cathode of a recirculating or flyback diode 4 (the anode of which is grounded), to one terminal of a so-called "flyback" capacitor 5 (the other terminal of which is grounded), and to one terminal of a deflection yoke 6 represented in FIG. 1 by a coil. The other terminal of yoke 6 is connected to one terminal of a control capacitor 7, the other terminal of which is grounded.

FIGS. 2a–2d illustrate the voltage potentials at various nodes over time. Assuming the components are ideal, when transistor 2 is turned off by control signal $V_1$ switching to low, at instant $t_0$ as shown in FIG. 2a, capacitor 5 and coil 6 (as well as capacitor 7, the high value of which, however, makes it negligible as compared with capacitor 5) define a freely oscillating resonant circuit, so that the voltage in capacitor 5 (equal to collector-emitter voltage drop $V_{cet}$) assumes a sinusoidal waveform as shown in FIG. 2b. The yoke current $i_g$ (which was maximum at instant to) decreases sinusoidally to minimum, so that the electron beam returns to the starting point, shown in FIG. 2c. At instant $t_1$, the capacitor voltage returns to zero, thus turning on diode 4, which maintains a zero voltage, thus preventing further oscillation of circuit 5, 6. In this phase, current $i_g$ in coil 6 is recirculated via diode 4, and presents a waveform (FIG. 2c) depending on the voltage at the coil terminals and, therefore, on the voltage at the terminals of capacitor 7, which in this phase is parallel to coil 6. More specifically, if the capacitor voltage were constant, the waveform of the current would be linear, increasing as of instant $t_1$ so as to produce an ideal sawtooth waveform (at least over the useful, i.e. rising, deflection portion, as shown by the dotted line in FIG. 2c). In actual practice, however, by virtue of the cathode-ray tube screen being roughly flat, as opposed to semispherical (with a constant radius), the rising portion of the deflection current waveform necessarily assumes the form of an S, as shown by the continuous line in FIG. 2c. This is due to capacitor 7, which is charged during conduction of diode 4, and discharged in the following interval, thus resulting in a parabolic voltage at the yoke terminals and the S-shaped current waveform shown in FIG. 2c.

Theoretically, the above situation should continue up to instant $t_3$, at which point, the current in the yoke is zeroed, thus turning off diode 4 and turning on transistor 2 for increasing the yoke current over the positive portion. In actual fact, however, due to the time lapse involved in turning off diode 4 and turning on transistor 2, the latter is turned on in advance so that a further control pulse is produced at instant $t_2$. Consequently, the transistor is turned on and saturated, as shown, thus maintaining a substantially zero $V_{cet}$ voltage, so as to discharge capacitor 7 and increase the yoke current as shown by the S-shaped curve.

The above operating mode is based on the assumption (which is actually false) that, when conducting, diode 4 and transistor 2 are capable of maintaining a zero $V_{ce}$ voltage (zero direct current voltage of diode 4 and saturation voltage of transistor 2), in which case, said voltage would present the theoretical $V_{cet}$ curve shown in FIG. 2b and described so far. In actual fact, however, voltage $V_{ce}$ presents the curve shown in FIG. 2d, which in interval $t_1-t_2$, presents a negative portion due to the direct current voltage of diode 4; and, in the interval $t_3-t_0$, a rising portion of other than zero due to the saturation voltage of transistor 2. As such, the actual curve of yoke current $i_g$ differs from that shown in FIG. 2c, thus resulting in serious, and highly visible, distortion of the picture, particularly in the first part of the screen. This is a known, prior art circuit.

Existing solutions devised to overcome the above drawback provide for an additional coil series connected to deflection coil 6, and the inductance of which varies according to the direction of the current, so as to compensate, in particular, the direct current voltage drop in diode 4 when conducting.

Though relatively cheap, the above solution provides for no more than a partial solution to the problem, in that it fails to compensate for distortion caused by the transistor, and even that of the diode is compensated by a fixed amount, thus resulting in only approximate correction. A further drawback of the above known solution is that the inductance of the additional coil is highly dependent on the characteristics of the transistor and the diode, so that the cost advantage is offset by requiring painstaking adjustment for achieving a high degree of performance.

SUMMARY OF THE INVENTION

It is an object of the present invention to provide a device enabling improved correction of the yoke current for achieving the required waveform and which entails no special adjustment due to the spread of the deflection stage components.

According to the present invention, there is provided a device for controlling the linearity of horizontal deflection stages.

A preferred, non-limiting embodiment of the present invention will be described by way of example with reference to the accompanying drawings.

BRIEF DESCRIPTION OF THE DRAWINGS

FIG. 1 shows an electric diagram of a known deflection stage to which the device, according to the present invention, is applied or has been explained in the background of the invention;

FIGS. 2a–2d show waveforms relative to the FIG. 1 diagram;

DETAILED DESCRIPTION OF THE INVENTION

Figure 3:
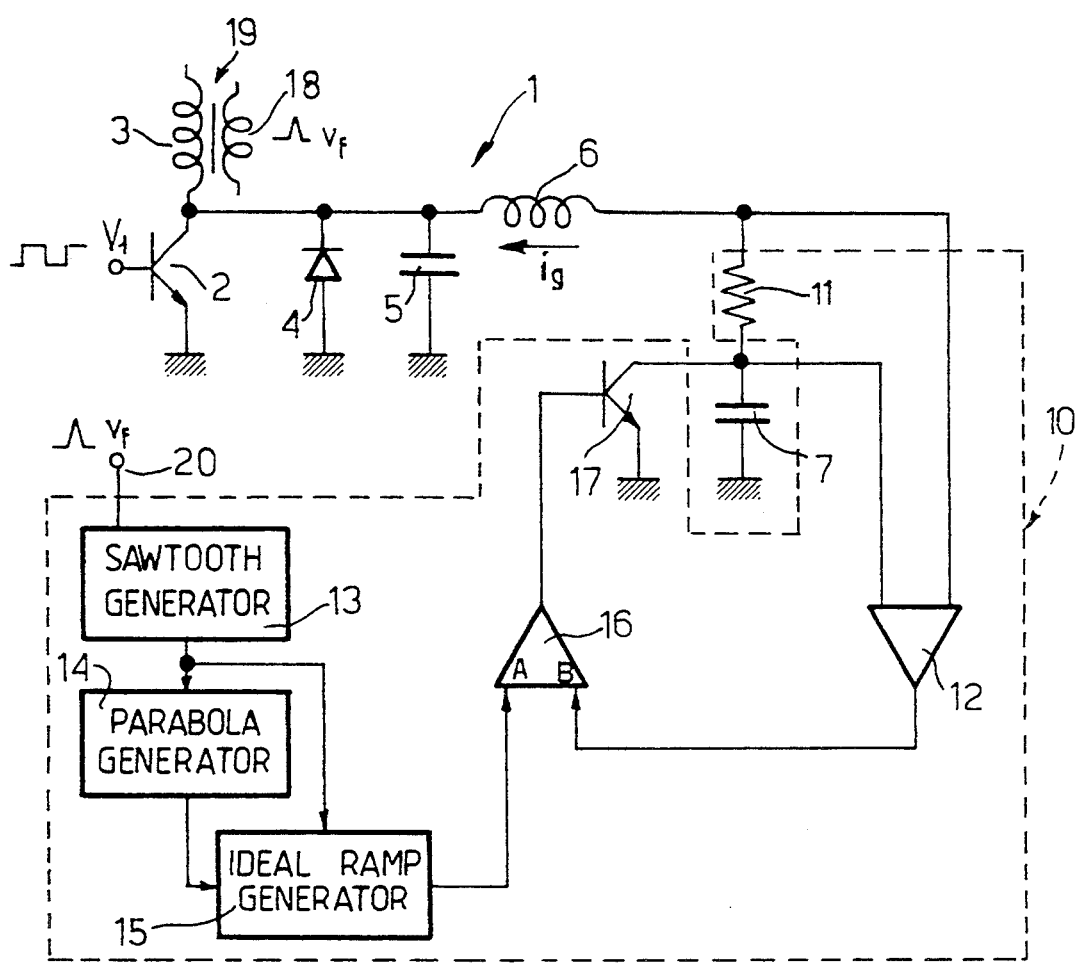
FIG. 3 shows a block diagram of one embodiment of the device according to the present invention.

FIG. 3 shows the device 10 according to the present invention as applied to horizontal deflection stage 1 described with reference to FIG. 1.

According to the present invention, device 10 comprises means for detecting the real current in yoke 6; means for generating an ideal yoke current waveform; means for comparing the real current with the ideal waveform and generating an error signal; and means for controlling the voltage at the terminals of capacitor 7 on the basis of the error signal so that the real yoke current presents the set ideal waveform.

In the embodiment shown, the means for detecting the real current $i_g$ in yoke 6 comprise a sensing resistor 11 of negligible value (about 0.1 $\Omega$) series connected to yoke 6 and capacitor 7; and an operational amplifier 12 input-connected to both terminals of resistor 11, for measuring its voltage and generating an output signal proportional to the real yoke current.

The ideal waveform generating means comprise a sawtooth generator 13 supplied (terminal 20) with the flyback pulses ($v_f$ voltage pulses at the terminals of primary winding 3 during flyback, and obtained via secondary winding 18 of line transformer 19); a parabola generator 14 receiving the sawtooth signal supplied by ramp generator 13; and an ideal ramp generator 15 receiving both the output signals from generators 13 and 14 for generating the required S-shaped waveform of the yoke current.

The means for comparing the real current with the ideal waveform and generating the error signal consist, in this case, of an error amplifier 16 having one input A connected to the output of ideal ramp source 15 and another input B connected to the output of operational amplifier 12.

The means for controlling the voltage at the terminals of capacitor 7 consist of a power transistor 17, in this case an NPN transistor, having the base terminal connected to the output of error amplifier 16, the emitter terminal grounded, and the collector terminal connected to the common point between capacitor 7 and sensing resistor 11.

The FIG. 3 device therefore detects the real current $i_g$ in yoke 6, compares it with the ideal waveform generated by generator 15, and, via transistor 17, accordingly adjusts the voltage at the terminals of yoke 6 so that current $i_g$ assumes the set ideal waveform. Obviously, the greater the loop gain of the loop system defined by device 10 and capacitor 7, the closer the resemblance will be between the real and set ideal waveforms.

Figure 4:
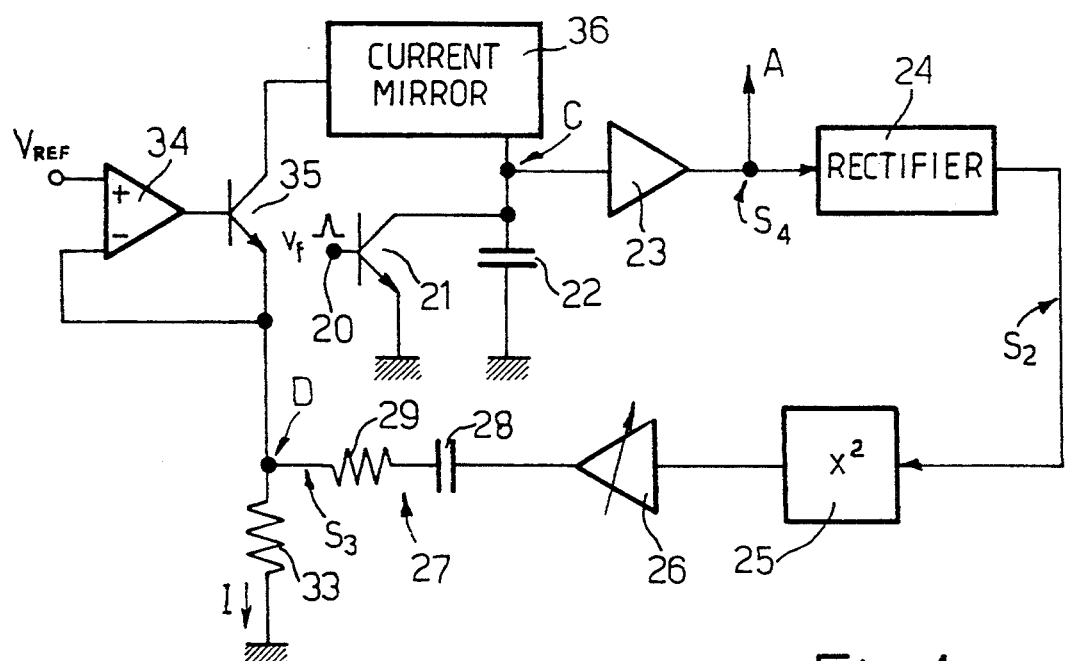
FIG. 4 shows a more detailed electric diagram of part of the FIG. 3 device.

One example of a simplified embodiment of generators 13–15 is shown in FIG. 4 wherein terminal 20 is defined by the base terminal of an NPN transistor 21 having the emitter terminal grounded and the collector terminal (defining point C) connected to one terminal of a capacitor 22, the other terminal of which is grounded. Point C is also connected to the input of an amplifier 23 defining a decoupling buffer, the output of which is connected to point A and to the input of a full-wave rectifying circuit 24. Circuit 24 is cascade-connected to an $x^2$ parabola generating block 25, in turn cascade-connected to a variable-gain amplifier 26 and a series RC filter 27 defined by a capacitor 28 and a resistor 20. The output of filter 27 is connected at point D to one terminal of resistor 33, the other terminal of which is grounded. The same point D is connected to the inverting input of an operational amplifier 34, the non-inverting input of which is connected to a temperature-stabilized, direct-current voltage $VRE_F$ and the output of which is connected to the base terminal of an NPN transistor 35 having the emitter terminal connected to point D, and the collector terminal connected to a current mirror circuit 36 output-connected to point C.

Figure 5A:
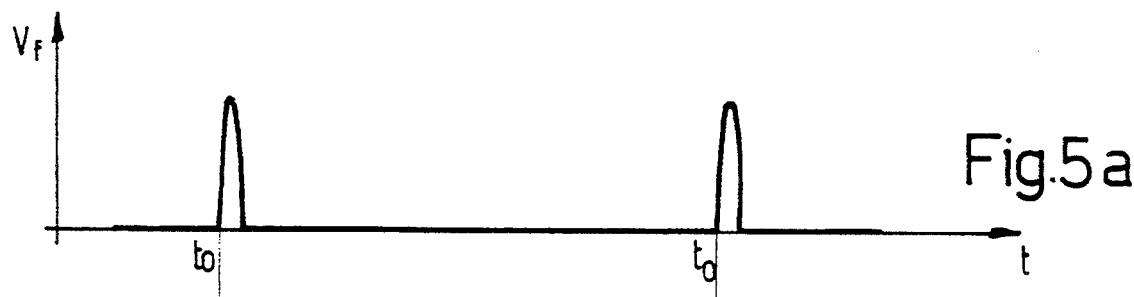
FIGS. 5a–5e show waveforms relative to the FIG. 4 diagram.
Figure 5B:
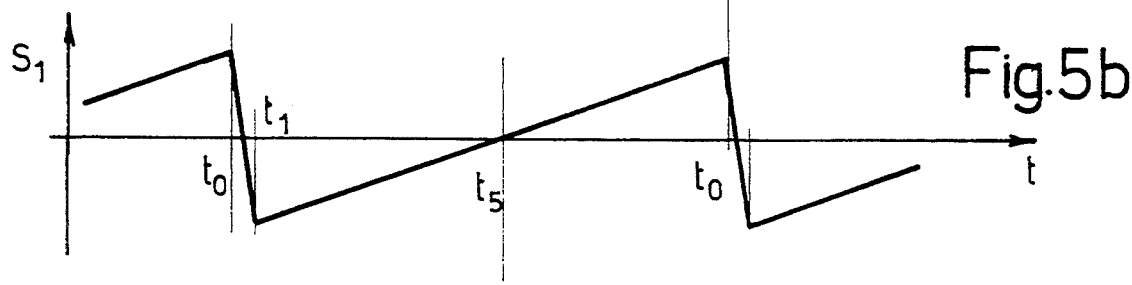
Figure 5C:
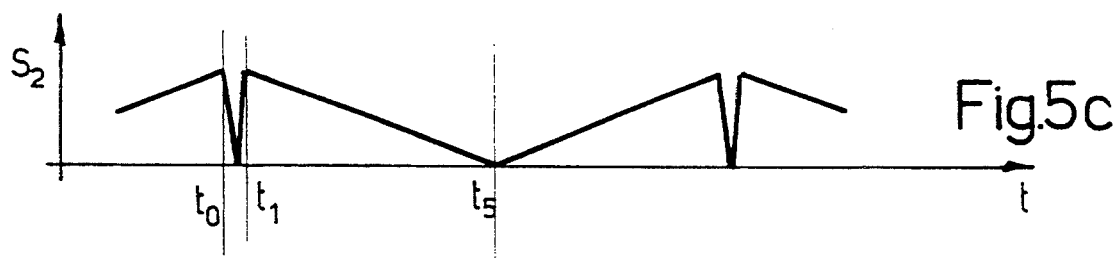
Figure 5D:
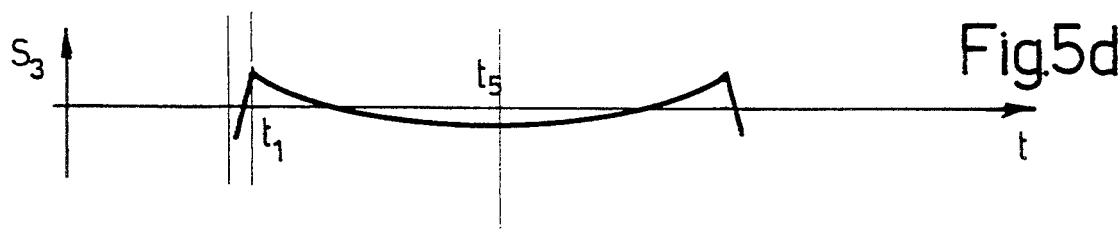
Figure 5E:
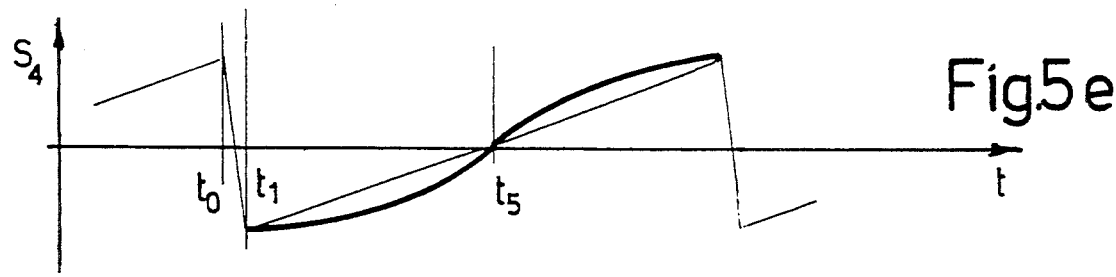

Operation of the FIG. 4 circuit will be described with reference to FIGS. 5a–5e. Under normal operating conditions, the voltage at the inverting input of operational amplifier 34, and consequently in resistor 33, is maintained equal to the stabilized voltage at the non-inverting input, so that resistor 33 presents a constant current of $I = V_{REF}/R$, where R is the resistance of resistor 33. Disregarding for the time being the current contributed by the feedback loop comprising components 24–29, current I is supplied by current mirror circuit 36 via transistor 35 and is equal (or, at any rate, in a fixed relationship) to that supplied by mirror circuit 36 to capacitor 21, which is thus charged linearly, as shown in interval from $t_1$-$t_0$ in FIG. 5b. When a flyback pulse $v_f$ is supplied to terminal 20, transistor 21 is turned on and saturated, so as to ground capacitor 22, which thus discharges, as shown in interval from $t_0$-$t_1$ in FIG. 5b, to produce a sawtooth waveform. This is d.c.-decoupled by buffer 23 to produce signal $s_1$ in FIG. 5b, which is rectified by rectifier 24 to produce output signal $s_2$ in FIG. 5c, which presents a first portion decreasing between $t_1$ and $t_5$, and a second portion increasing between $t_5$ and $t_0$. Signal $s_2$ is processed by block 25 for generating a parabolic waveform which, amplified by amplifier 26 and filtered by filter 27 to remove the direct-current offset, produces current signal $s_3$, as shown in FIG. 5d. Said current reduces (when positive) or increases (when negative) the current to be supplied by mirror circuit 36 via transistor 35, so that, at $t_1$ and $t_0$, at which the current supplied by filter 27 is maximum, the current supplied by mirror circuit 36 is minimum; the capacitor charges .slowly; and the voltage at its terminals presents a minimum slope. As the value of signal $s_3$ decreases, the current supplied to the capacitor increases, thus increasing the slope of the voltage at its terminals, which reaches maximum at $t_5$, when current $s_3$ is minimum. Subsequently, as current $s_3$ increases, the voltage increase in capacitor 22 slows down until it eventually returns to minimum at $t_0$, so that point A presents signal $s_4$, the waveform of which presents a minimum and maximum slope, as described, and thus the desired S-shaped pattern.

In other words, components 33 and 34 define a constant current I source; capacitor 22 defines a ramp generator; transistor 21 defines a switch for periodically discharging the capacitor; components 23–25 define a multiplying element for producing a first parabolic quadratic signal; filter 27 defines a high-pass filter for producing a second quadratic signal minus the direct-current offset; and point D defines an adding element.

In the FIG. 4 circuit, by varying the gain of variable amplifier 26 (which, for the purpose, features a control input (not shown) connected to an external pin on the device), it is possible to modify the amplitude of signal $s_3$ and, therefore, the difference between the ideal ramp and sawtooth waveform with linearly-increasing portions, for adapting the ideal waveform easily to the design of the screen.

The advantages of the device according to the present invention will be clear from the foregoing description. In particular, the loop solution for tracking the ideal waveform (by compensating the yoke current according to the amount of error involved) provides for a considerable improvement in performance of the deflection stage, the yoke current of which assumes the exact desired S-shaped waveform for any cathode-ray tube, regardless of the characteristics of drive transistor 2 or diode 4.

The solution described therefore requires no setting adjustments other than the gain of amplifier 26, which provides for adapting the device easily to any cathode-ray tube or screen, even semispherical (constant-radius) types.

The ideal signal is already timed in relation to the yoke current curve by virtue of employing the flyback signal for synchronizing the FIG. 4 circuit. Even in the event of changes to the yoke current waveform, the general solution shown in FIG. 3 is nevertheless adaptable by simply providing for appropriate ideal waveform generators.

Finally, the device according to the present invention is readily integratable, with the exception of a few components, such as capacitor 22, for reasons of size, and filter 27 and resistor 33, for reasons of precision.

To those skilled in the art, it will be clear that changes may be made to the device as described and illustrated herein without, however, departing from the scope of the present invention. In particular, the circuits of FIG. 3 for sawtooth, parabola, and ideal ramp generators may differ from those described herein in FIG. 4, for example, block 25 may be replaced by an integrator. The same also applies to the other components of the device, which may be replaced by equivalents. For example, the yoke current-sensing resistor may be replaced by a transformer having the primary winding series-connected to yoke 6. Other suitable circuit elements may be used by those of skill in the art.

We claim:

1. A device for controlling the linearity of a horizontal deflection stage comprising:
   a deflection yoke supplied with a real yoke current and series-connected to a control capacitor for varying the voltage in said yoke;
   means for detecting said real yoke current, said means generating an output signal in response to said real yoke current;
   generator means for generating an ideal signal having a predetermined waveform;
   means for comparing the detecting means output signal with said ideal signal and generating an error signal; and
   control means for receiving said error signal and modifying the voltage in said control capacitor so that said real yoke current assumes said predetermined waveform wherein said generator means includes:
      a current source for supplying a constant current;
      a charge capacitor supplied by said current source and generating a sawtooth signal;
      switch means for periodically discharging said charge capacitor;
      a multiplying element for receiving said sawtooth signal and generating a quadratic signal; and
      an adding element for adding said constant current to said quadratic signal.

2. A device as claimed in claim 1, wherein said control means include:
   a bipolar power transistor having emitter, collector, and base terminals, said transistor having said emitter and collector terminals connected parallel to said control capacitor and said base terminal connected to said comparing means.

3. A device as claimed in claim 1, wherein said current source includes a resistor having a terminal connected to a constant voltage source and to the output of said multiplying element, and wherein said multiplying element comprises:
   a buffer connected to said charge capacitors for eliminating the direct-current offset of said signal;
   a rectifier connected to the output of said buffer for generating a rectified signal;
   a quadratic circuit connected to the output of said rectifier for generating a signal proportional to the square of said rectified signal;
   a variable-gain amplifier connected to the output of said quadratic circuit; and
   a high-pass filter connected between said amplifier and said terminal of said resistor.

4. A horizontal deflection stage comprising a deflection yoke supplied with a real yoke current and series-connected to a control capacitor for varying the voltage in said yoke;
   means for detecting said real yoke current, said means generating an output signal in response to said real yoke current;
   generator means for generating an ideal signal having a predetermined waveform;
   means for comparing said detecting means output signal with said ideal signal and generating an error signal; and
   control means for receiving said error signal and modifying the voltage in said control capacitor so that said real yoke current assumes said predetermined waveform wherein said generator means includes:
      an ideal ramp generator connected to one input of the comparing means;
      a parabola generator connected to one input of the ideal ramp generator; and
      a sawtooth generator connected to one input of the ideal ramp generator;
      wherein said ramp generator includes a capacitor having one side coupled to the output of a bipolar transistor and also coupled to the output of a current mirror.

5. A device as claimed in claim 4, wherein said means for detecting said real yoke current comprises a resistor series-connected to said yoke and said control capacitor.

6. A device as claimed in claim 4, wherein said comparing means includes:
   an error amplifier having two inputs connected respectively to said generator means and said means for detecting said real yoke current.

7. The stage according to claim 4 wherein said parabola generator includes a rectifier and a squaring circuit coupled in series.

8. The stage according to claim 4 wherein said parabola generator includes a rectifier and an integrated amplifier coupled in series.

9. A device for controlling the linearity of a horizontal deflection stage comprising:
- a deflection yoke supplied with a real yoke current;
- means for detecting the real yoke current, said means providing a real yoke current indicating signal in response to the real yoke current;
- a sawtooth generator producing a sawtooth generator signal;
- a parabola generator receiving the sawtooth generator signal and producing a parabola generator signal;
- a ramp generator producing a predetermined ideal waveform in response to the sawtooth generator signal and the parabola generator signal;
- a comparing element, said comparing element comparing the real yoke current indicating signal and the predetermined ideal waveform and generating an error signal; and
- control means for receiving the error signal and modifying the real yoke so that the real yoke current indicating signal approximates the predetermined ideal waveform wherein said parabola generator comprises:
- a means for monitoring voltage across the capacitor, said means producing an output signal in response to the monitored voltage;
- a rectifier, said rectifier producing a rectified voltage in response to the output signal from said monitoring means; and
- a squaring circuit, said squaring circuit producing a substantially parabolic waveform in response to the rectified voltage and wherein said sawtooth generator comprises:
- a controlled current source producing a reference current;
- a current mirror responsive to the reference current, and current mirror charging a capacitor in response to the reference current; and
- a switching means connected across the capacitor, said switching means discharging said capacitor in response to a flyback pulse.

10. The device of claim 9 wherein said ramp generator comprises: an adding element, said adding element connected to said controlled current source;
- said adding element further receiving the parabolic waveform and adjusting the reference current in response to the parabolic waveform; and
- an ideal waveform output terminal receiving the output signal from the capacitor voltage monitoring means and outputting a waveform proportional to the voltage across the capacitor.

11. The device of claim 10 further comprising a variable gain amplifier connected between the parabola generator and the adding element.

* * * * *